R. G. PACKARD.
GANG DRILL FOR SUBAQUEOUS EXCAVATION.
APPLICATION FILED APR. 24, 1917.
1,265,494.
Patented May 7, 1918.
6 SHEETS—SHEET 1.
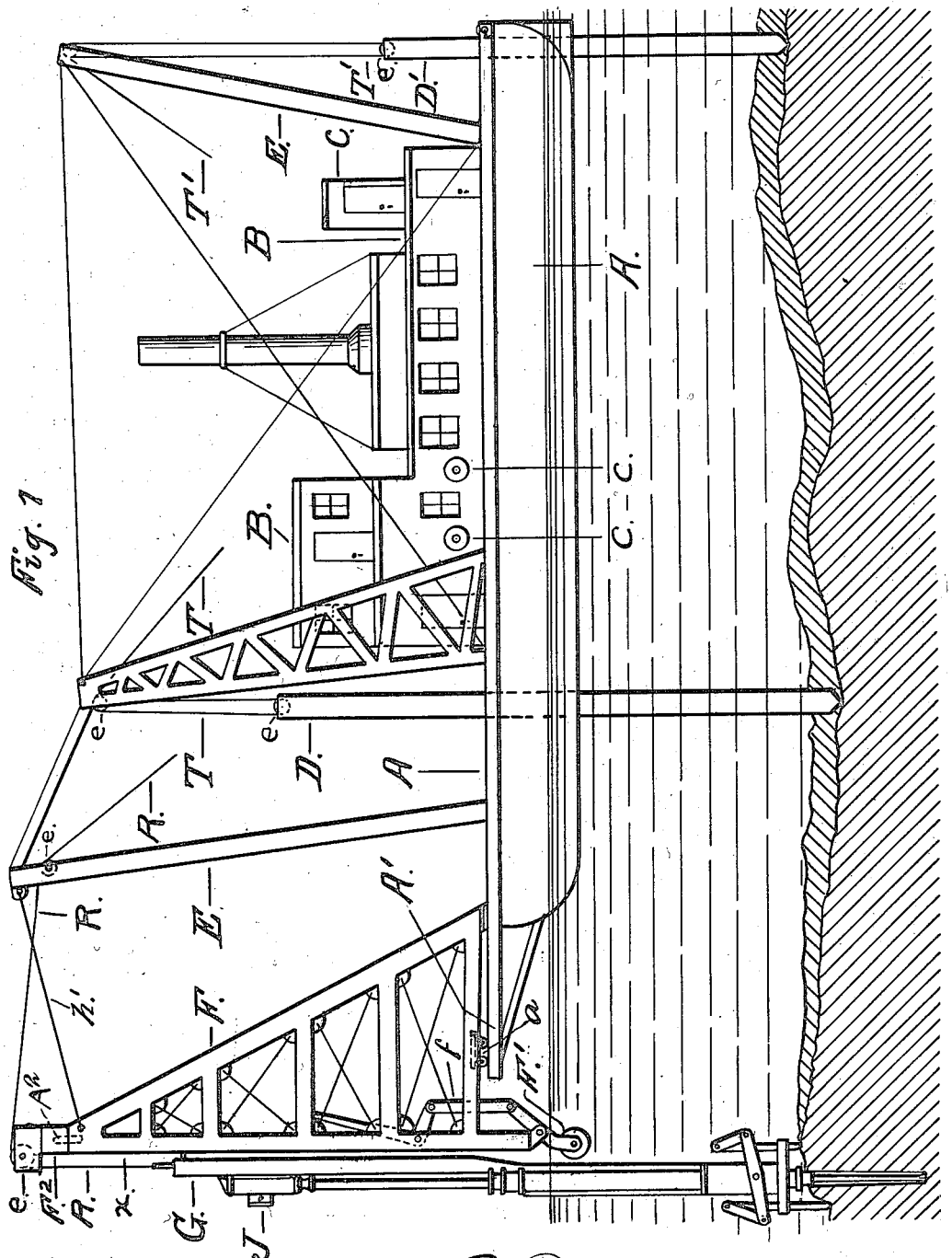
R. G. Packard, Inventor.

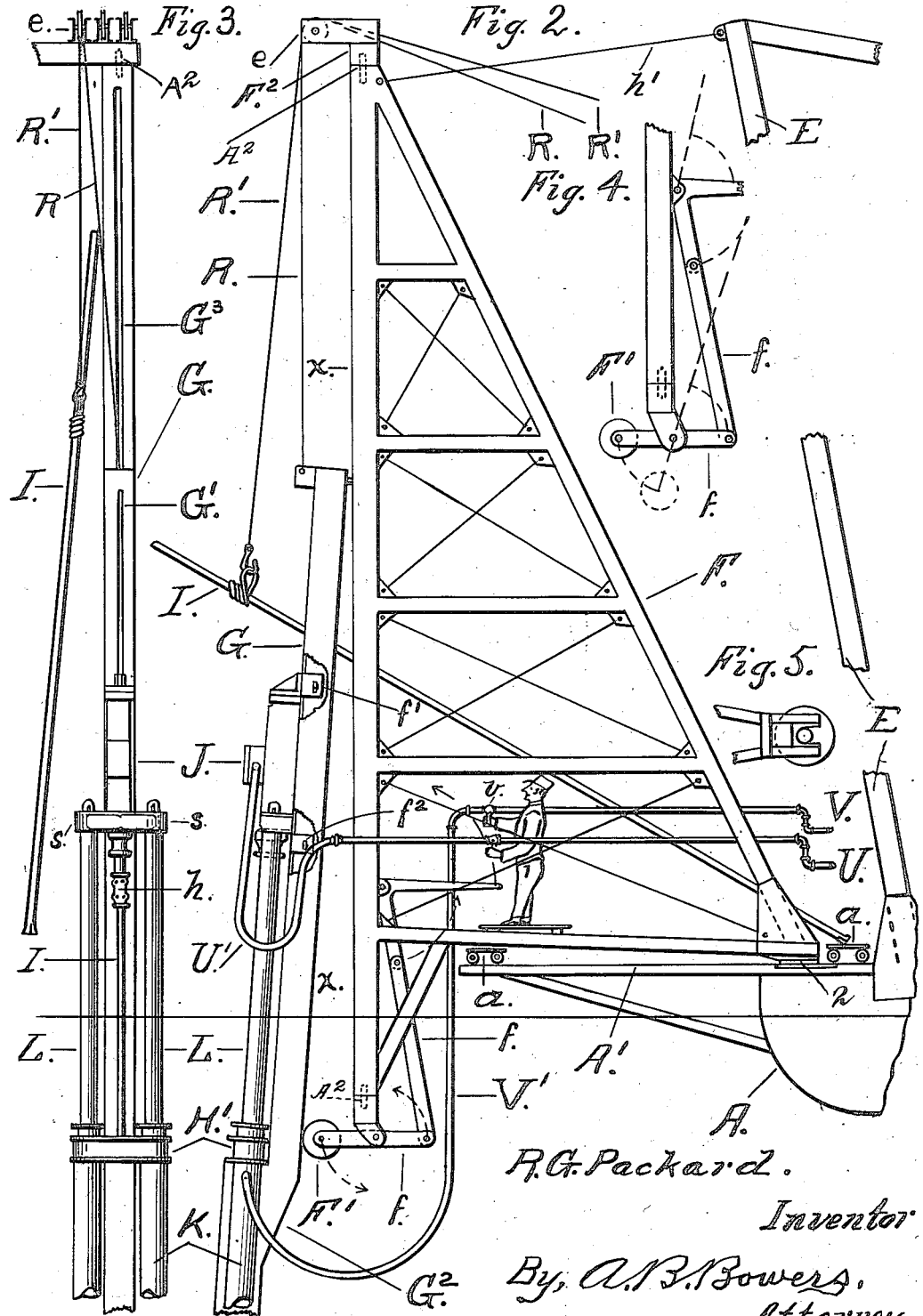

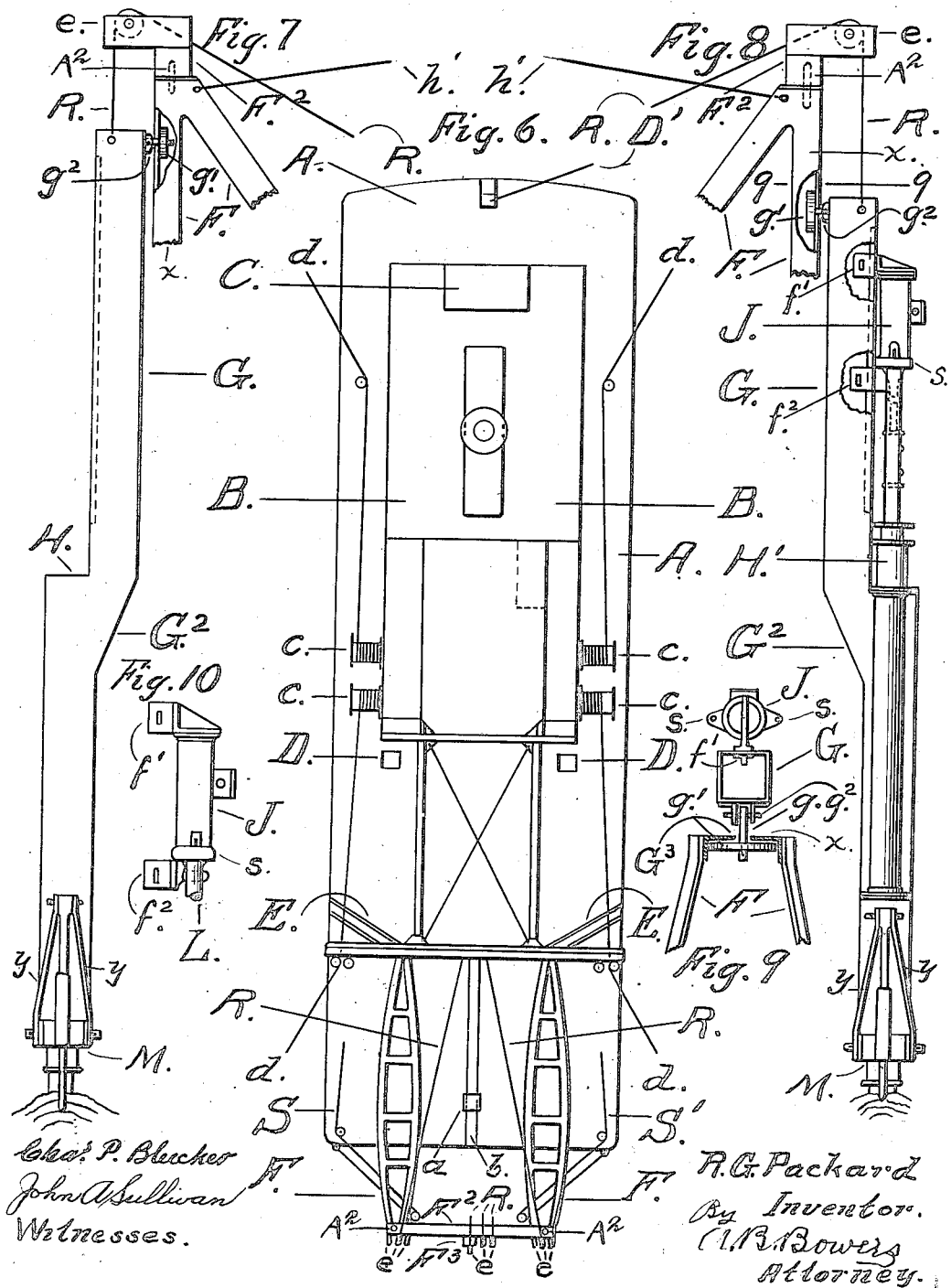

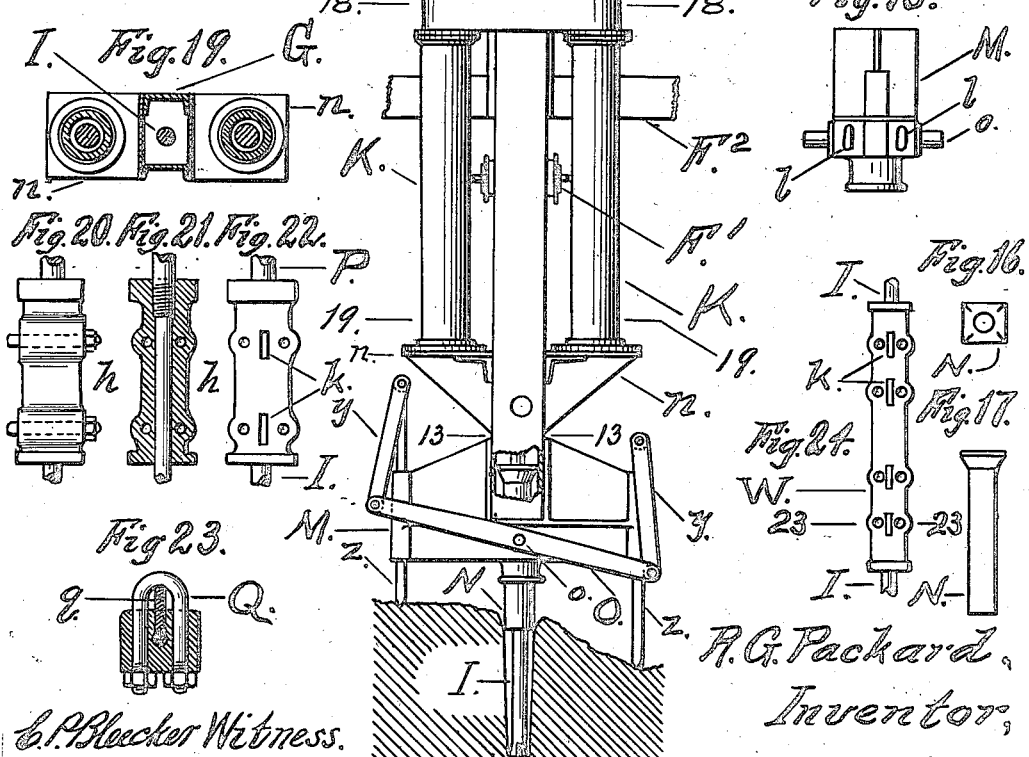

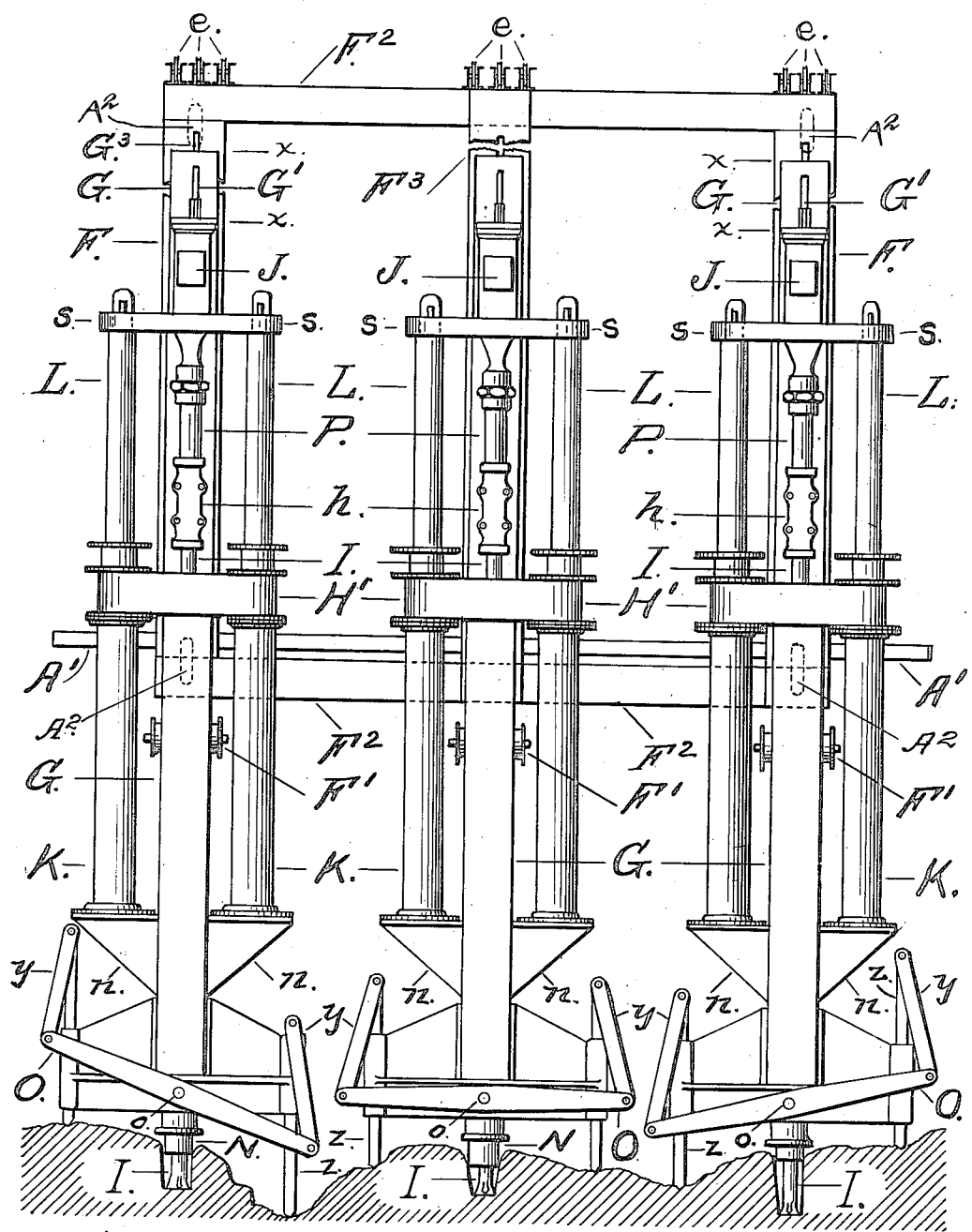

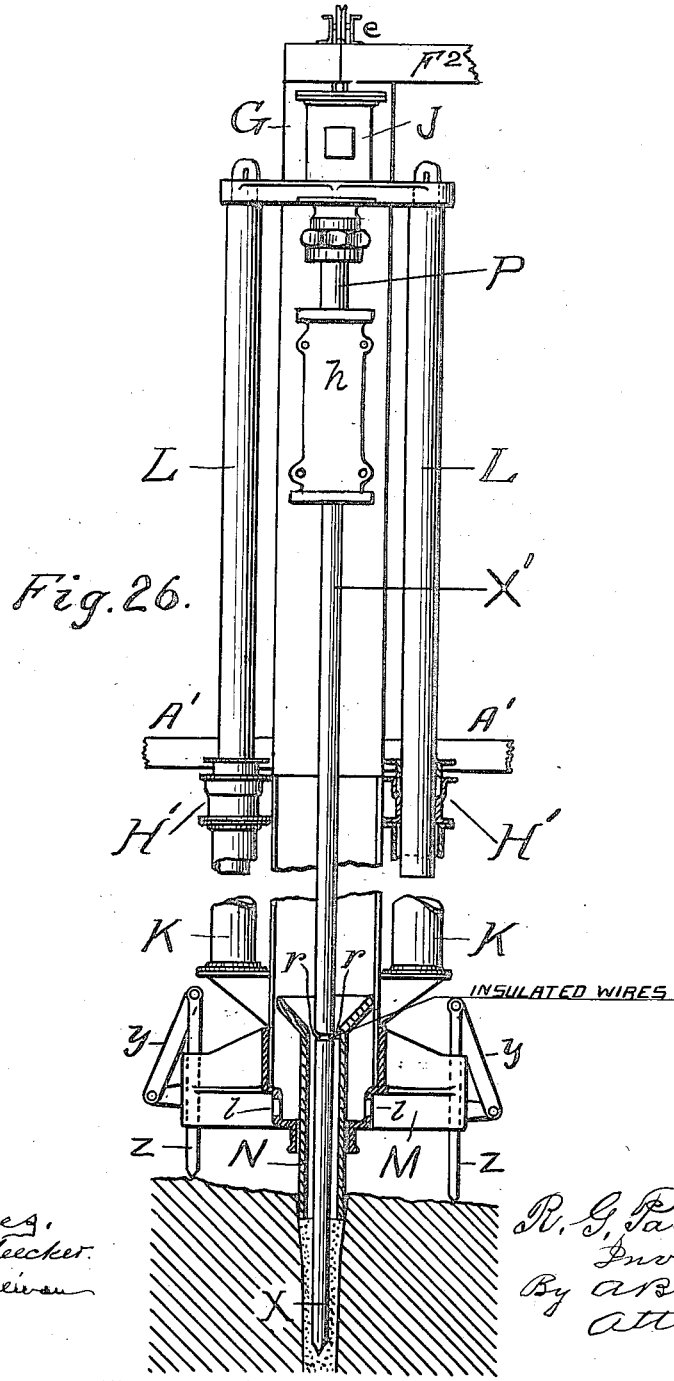

UNITED STATES PATENT OFFICE.

RALPH G. PACKARD, OF BROOKLYN, NEW YORK.

GANG-DRILL FOR SUBAQUEOUS EXCAVATION.

1,265,494. Specification of Letters Patent. Patented May 7, 1918.

Application filed April 24, 1917. Serial No. 164,301.

*To all whom it may concern:*

Be it known that I, RALPH GOODING PACKARD, a citizen of the United States, now residing at 84 Columbia Heights, Brooklyn, in the State of New York, have invented a novel and useful Gang-Drill for Subaqueous Excavation.

The drilling with machines now in use, has to be close to the hull on which these devices are mounted, and no heavy blasting can be done with safety without first moving the machine to a considerable distance from the charge before firing.

In the strong currents and frequent rough water in the rocky channels of the East river and Hell Gate, it was always difficult and sometimes impossible to get back to exactly the right place for further drilling and blasting. This caused an irregular spacing of holes and lack of uniform breakage of the rock bottom, leaving lumps that had to be found and removed at much additional expense. Better arrangement for replacing the machine was needed.

Another defect was lack of capacity for further adjustment and more regular spacing of holes after replacing the hull as nearly as possible in proper position for further drilling.

Greater flexibility than in machines now in use is needed between the drilling mechanism and the hull to prevent cramping, jamming and bending of drills, not only in rough, but even in ordinary smooth water, because of the swell from passing steamships, and the choppy sea always present when a stiff breeze is against the tide.

The clamps or chucks by which the drills were secured to the piston-rods would not hold these heavy drills with sufficient firmness. The single hydraulic hoist by which each drill was raised, lowered and fed to its work, was located above the drill, making the structure long, of inconvenient height, cumbersome and unwieldy.

These long, heavy drills had to be taken to the forge for re-sharpening after each deep hole had been drilled and some device was needed for their easier and quicker handling.

The object and effect of this invention, is the elimination of these defects and a further material reduction in the cost of such work.

Figure 1 is a side view, without full details, of the whole machine.

Fig. 2, Sheet 2, is an enlarged side view of one of the cranes F, with most of its attachments.

Fig. 3, is a front view, in part, of Fig. 2, showing the drill-steel I, raised to the top of the crane F.

Fig. 4, shows device for handling the roller $F^1$.

Fig. 5, is a plan of the inner foot 2, Fig. 2, of the crane F.

Fig. 6, Sheet 3, is a plan of the machine without full details.

Fig. 7 is a side view of the drill-column G, without full details.

Fig. 8 is a side view of the drill-column G, drill-engine J, hydraulic cylinder K, and plunger L.

Fig. 9 is a cross-section through the upright front member of the crane F, in the line 9—9, Fig. 8, and a top view of the flexible connection between the drill-column and crane, consisting of the parts $g$, $g'$ and $g^2$.

Fig. 10 is an enlarged side view of the drill-engine J, showing projections $f^1$, $f^2$, bracketed to the heads of the engine, to slide in the slot $G'$, of the drill-column G. It also shows the upper end of the plunger L, keyed into a lug projecting from the lower end of the drill-engine.

Fig. 11 is a front view of a single drill-column and drill intermediate between the cranes, mounted on the vertical column $F^3$, secured to the girders $F^2$, $F^2$. This drill column and drill only, may be used in the removal of lumps and pinnacles.

Fig. 12 is a side view of the casting M, forming a portion of the lower end of the drill-column G.

Fig. 13 is a cross-section of the drill-column G, in the line 13—13, of Fig. 11, with a top view or plan of the flared or funnel-headed tubular telescoping casting N, shown in Fig. 17, and a plan of part of the casting M.

Fig. 14 is a top view or plan of the entire casting M.

Fig. 15 is an end view of said casting M.

Fig. 16 is a top view of Fig. 17.

Fig. 17 is a side view of the tubular casting N, that telescopes within the lower end of the drill-column G.

Fig. 18 is a cross-section of Fig. 11, in the line 18—18.

Fig. 19 is a cross-section through the drill-column G, drill-steel I, cylinders K, K, and plungers L, L, line 19—19, Fig. 11, above, and looking down upon the brackets $n$, $n$, that support said cylinders.

Fig. 20, is a side view, Fig. 21, a longitudinal section, and Fig. 22, a front view of the chuck $h$.

Fig. 23 is a plan of the U-bolt Q, and a cross-section of the chuck and the clamp $q$ in the line 23—23 of Fig. 24.

Fig. 24 is a double clutch for coupling on an additional drill-steel I.

Fig. 25, Sheet 5, is a front view of a gang of three drills; the front members of the cranes being broken near the top to allow a larger scale for the drills and their actuating mechanism.

Fig. 26 illustrates the method of charging the drill-holes.

For convenience of reference, details will now be explained in alphabetical paragraphs.

A, Fig. 1, is a floating vessel or hull on which my improvements and actuating mechanism may be mounted.

A′, is a platform extending forward from the front end of the hull, under and nearly to the outer ends of the swinging cranes, but leaving room for the vertical front members of these cranes which extend below the platform, to swing for adjustment of the position of the drills.

$a$, Figs. 1, Sheet 1; 2, Sheet 2; and 6, Sheet 3, is a car for automatically carrying the drill-steels to and from the forge.

$a^2$, Figs. 6, 7 and 8, Sheet 3, and 25, Sheet 5, are hinges between the girders $F^2$, $F^2$, and the vertical members of the cranes.

B, Figs. 1 and 6, is the housing for the boilers, engines, hoisting drums, forge, etc.

$b$, Fig. 6, is the track on which the car, $a$, runs.

C, Figs. 1 and 6, is the magazine or storeroom for the explosives used in blasting.

$c$—$c$—$c$—$c$ are winding drums.

D—D′, Figs. 1 and 6, are ordinary vertical anchors, or "spuds", for holding the machine in position and are raised and lowered in the usual manner.

$d$—$d$—$d$—$d$, Fig. 6, Sheet 3, are cables running from winding drums $c$—$c$—$c$—$c$ to anchors for warping the hull into position for drilling. With these cables and drums in connection with fore and cross-ranges, aided by a swing of the crane F, the proper spacing of the drill-holes may be secured with sufficient accuracy.

E—E, Fig. 1, Sheet 1, Fig. 2, Sheet 2, and other figures, are A-frames or other suitable frame-work for supporting the cranes F, F, to which they are connected by wire ropes $h'$, or other suitable devices. Similar framework or masts may be used for raising the vertical anchors or "spuds", D—D′.

$e$, in Figs. 1, 2, 3, 11, 25 and 26 represents, sheaves over which lines pass to suitable devices for raising and lowering the vertical anchors, drill-columns, drills and rod used for charging the drill-holes.

F, Figs. 1 and 2, and F, F, Fig. 6 are cranes—implements for hoisting and swinging, too well known to need illustration or description excepting wherein they differ from the usual construction. They carry the drilling mechanism and are here shown as triangular in form. They are supported by wire ropes, $h'$, from the frame-work E, Figs. 1, Sheet 1, and 2, Sheet 2; but whatever their construction, they are provided with vertical outer front members $x$—$x$, Figs. 1 and 2, and may be swung by any of the usual devices. The front members of these cranes may be made of heavy angle-irons, as indicated in Fig. 9, Sheet 3, set slightly apart to leave a vertical slot $G^3$, between them for the reception of the sliding flexible connection $g$ $g'$ and $g^2$, Fig. 9, Sheet 3. When so constructed the inner edges of the angle-irons are suitably tied together, at short intervals, to prevent springing or opening of the slot $G^3$. The office of this vertical front member $x$ is to support and guide the head of the drill-column G, as it is raised and lowered, and when this column rests on the rock bottom, to hold it in a nearly vertical position, and it allows the crane to rise and fall with the tide or the heaving of the hull in the swell of the sea, without interruption of the work of drilling.

These cranes F, F, Fig. 6, Sheet 3, are set at a distance apart suitable for the number of drills they are to carry with the desired spacing between the drills and drill holes and are pivoted to allow a lateral or side swing for further adjustment of the position of the drills after dropping the vertical anchors or "spuds" D—D′.

F′, F′, F′, Figs. 1, 2 and 25, are rollers secured to the foot of their several vertical members for swinging the drill-columns G, G, G, away fom said vertical members of the cranes, to prevent disturbance of these columns as the cranes rise and fall with the tides and swell of the sea. These rollers and columns may be swung by hand through the compound levers $f, f$. A roller and drill-column so swung, is shown in Fig. 2, Sheet 2.

$F^2$, $F^2$, Figs. 6, 11 and 25, are girders hinged to the tops and bottoms of the cranes F, F. They have, with the cranes, a parallel motion and carry the desired number of intermediate drills.

$F^3$, Figs. 11, Sheet 4, and 25, Sheet 5, is a vertical member similar to the members $x-x$ of the cranes. It is mounted on the girders $F^2-F^2$. Other vertical members $F^3$, may be secured to the girders $F^2$, $F^2$, if more than three drills are desired in the gang.

$f$, Figs. 1 and 2, is a compound lever for swinging the roller $F'$ and drill-column G.

$f'$ and $f^2$, Figs. 8, 9, 10, Sheet 3, are thin projections bracketed to the heads of the drill-engine J. They are keyed into and slide freely in the slot $G'$ of the drill-column G, Figs. 3, Sheet 2, and 8 and 9, Sheet 3.

G, Fig. 1 (shown in detail in Figs. 7, 8, and 9, Sheet 3 and 18, Sheet 4) is a "drill-column" on which a drill and its actuating mechanism is mounted. It may be of any suitable construction, but is preferably rectangular in cross-section, and made of long, narrow steel plates, riveted to channel-steel as indicated, at G, Fig. 18, Sheet 4, though I do not confine myself to this form of construction. It is provided with a flexible connection (Fig. 9, Sheet 3), at its upper end, adjusted to slide freely in the vertical slot $G^3$, (Figs. 3, Sheet 2, and 7, 8 and 9, Sheet 4) or other suitable device in or on the front member $x$ of the cranes F, F. The flexibility of this connection and its freedom to slide up and down in the slot $G^3$ or other suitable device in or on the front member $x$, of the cranes, enables the work of drilling to proceed without interruption from the rise and fall of the tides or swell of the sea.

$G'$, Fig. 3, is a longitudinal slot in the drill-column G, above the offset $G^2-H$, for the reception and guidance of the projections $f'$ and $f^2$ of the drill-engine J, Figs. 8, 9 and 10, Sheet 3.

$G^2$ and H, Figs. 7 and 8, Sheet 3, is an offset near the middle of the drill-column G.

$G^3$, Fig. 3, is a vertical slot in the front member, $x$, of the cranes F, F, for holding and guiding the head of the drill-column G.

$g$, Fig. 9, is part of a flexible sliding connection between the head of the columns G and the vertical members $x$, of the cranes. It is elongated in Fig. 9 to prevent confusion of parts. In practice it is just long enough to slide freely in the slot $G^3$.

$g'$, Fig. 9, is a roller that holds the part $g$ in the slot $G^3$, and prevents it from coming in contact with the edges of the slot.

$g^2$, Figs. 7, 8 and 9, Sheet 3, indicates the lugs and pin at the head of the drill-column G, forming, with the parts $g$ and $g'$, a flexible connection between the drill-column and crane.

H, Fig. 9, is the top of the offset $G^2-H$, and forms a seat for the casting $H'$.

$H'$, is a casting secured to the offset H, to hold the heads of the hydraulic cylinders K—K, in proper position. The prolongation of the drill-column below this offset $G^2-H$ forms a guide and shield for the drill-steel and avoids the necessity for the separate tube, for this purpose, required in applicant's earlier devices.

$h$, Fig. 11, Sheet 4, shown in detail in Figs. 20, 21, 22 and 23, is a tubular chuck by which the drill-steel I, is secured to the piston-rod P, of the drill engine J. It may be fitted to the piston-rod with a slightly tapering screw-connection and screwed tightly up the taper when hot and shrunk on. It is provided through one side with two rectangular openings, $k$, Fig. 22, for the reception of clamps, and four round holes through the chuck for reception of the U-bolts, that hold these clamps against the drill-steel. A longitudinal section, Fig. 21, shows the chuck screwed and shrunk on to the piston-rod P, and the drill-steel I, in place for clamping. One of these U-bolts, Q, and the clamp $q$ are shown in Fig. 23.

I, the drill-steel, Figs. 3, 11 and 25, is a rod about 30 feet long. The usual practice of securing a drill to the end of the drill-steel, is not satisfactory for heavy work, and I make the drill on the end of the drill-steel upsetting the cutting edges to cut a hole larger in diameter than that of the drill-steel.

Into the arms (cast on opposite sides of the lower end of this engine) are keyed the heads of the plungers L—L for raising and lowering the engine and drill.

K—K, Fig. 11, are hydraulic cylinders for receiving the plungers L, L, for raising and lowering the drill-engine and drill. They are mounted, one on each side of the lower half of the drill-column G, equidistant from and in line with the piston rod and drill to give a balanced upward thrust. They are actuated by power from a high-pressure pump on the hull, through the pipe V, and hose $V'$, Fig. 2. By turning the valve $v$ in one direction water is admitted to raise the plungers, and by turning in opposite direction, water escapes and the plungers are lowered.

L—L, the plungers of the hydraulic hoists, are tubes working freely within the cylinders K—K, plugged at each end and provided with a stuffing box and gland of the usual construction.

M, detailed and described under Figs. 11, 12, 13, 14 and 15, Sheet 4, is a casting forming the lower end of the drill-column.

N, Figs. 11, 25 and 26, is the telescoping casting shown in position, Fig. 11, Sheet 4, and in longitudinal section in position, in Fig. 26, Sheet 6. Its head is larger than the opening through the casting M, to prevent it from dropping out as the drill-column is raised. It telescopes automatically as the column is lowered.

$n$, $n$, Figs. 11, 25 and 26, are brackets for supporting the hydraulic cylinders K, K.

O, Figs. 11 and 25, is a rock bar mounted on trunnions $o$, $o$, Figs. 11 to 15, and linked to the legs $z$, $z$, to enable said legs automatically to adjust themselves to the inequalities of the rock bottom.

$o$—$o$, Figs. 12 to 15, are the trunnions on which the rock bars O, O, are mounted.

P is the piston-rod of the drill-engine.

Q, Fig. 23, is one of the U-bolts of the chuck $h$ for clamping the drill-steel I.

$q$, of same figure, is one of the clamps of said chuck $h$.

R—R', Fig. 2, are lines passing over the sheaves $e$, to the usual hoisting devices of the cranes. These lines are used in raising and lowering the drill-columns, drill-steels and rod X'.

$r$, $r$, Fig. 26, are insulated wires leading from an electric battery, to exploders within the charge of the cartridges, for exploding said charge.

S—S', Fig. 6, are lines for swinging the cranes F—F.

T—T', Fig. 1, are lines for hoisting the vertical anchors or "spuds" D—D'.

U, Fig. 2, is the steam pipe and U' the steam hose of the drill-engine J.

V, Fig. 2, is the water pipe, V', the water hose of the hydraulic cylinders K—K.

W, Fig. 24, is a double-chuck coupling.

X, Fig. 26, is a slightly tapering metallic cartridge usually made of No. 26 galvanized sheet-steel, and of suitable length to hold the required charge. The larger or upper end is closed, after charging, with a wooden plug, the lower end may be folded or otherwise constructed to form a point.

X', is a wooden rod for forcing the cartridge X to the bottom of the hole.

$x$—$x$ are the vertical front members of the cranes F—F, Figs. 1 and 2.

$y$—$y$ are the links, and $z$—$z$ are automatically adjustable legs of the drill column G.

Sometimes one drill steel will not reach to the required depth of hole and must be lengthened. Then a double-chuck-coupling, W, Fig. 24, is used. A drill steel of the usual length without cutting edges is clamped to the piston-rod and to its lower end is clamped the upper half of the double-chuck-coupling W. A drill-steel long enough to reach to the desired depth, with cutting edges on its lower end, is then clamped in the lower half of the double chuck.

The cutting edges of the drill-steel must be re-sharpened after the sinking of each hole. For this purpose the steel is unclamped at $h$, the drill-engine J, raised by the hydraulic hoists K—K, to the top of the column G, and this column raised to the top of the crane F, Fig. 26, Sheet 6. The drill-steel I is then raised to the position shown in Fig. 3, Sheet 2. It is then swung inboard by hand and lowered till its lower end rests on the car $a$, at the outer end of the platform A'. The lowering is continued and the weight of the steel automatically forces the car inward (as indicated in Fig. 2) until it reaches the forge where the drill-steel is re-sharpened. The sharpened end is then placed on the car $a$, which is automatically drawn back as the steel I is again raised to the position shown in Fig. 3 to be lowered into the lower half of the tubular drill-column G, preparatory to reclamping in the chuck $h$, which is then lowered to receive it.

The diameter of the telescoping tubular, funnel-headed casting N, Figs. 11 and 17, Sheet 4, is less, below its head, than the bore of the lower tubular portion of the casting M, through which it passes, and its lower end is free to swing an inch or so in any direction. The drill swinging within and against this casting N, swings the casting itself in all directions, and, at first, cuts a tapering hole large enough to let the casting N, drop into it and seal it from overlying or drifting mud or sand, and furnish a guide for the cartridge in charging the hole after the removal of the drill. The fine sand made by the drill escapes to some extent through the openings $l$, in the casting M, Figs. 12, 15 and 26, Sheets 4 and 6. What remains in the hole is usually of a soft slushy or muddy character through which the cartridge can readily be pushed, as hereinafter described. The washing out of the hole with a water jet is seldom necessary and generally a detriment inasmuch as the debris is useful for tamping around and above the charge.

When a gang of drills is used, as shown on Sheet 5, in Fig. 25, a man is required for each drill which drill is fed to its work by allowing water slowly to escape from the cylinders K—K. Constant watchfulness is necessary, for if the water is allowed to escape too fast the stroke of the piston gets shorter and shorter until the engine becomes inoperative, while if not let out fast enough the piston will pound on the lower cylinder-head. This pounding is readily detected by the operator, who immediately lowers the engine.

When a hole has been sunk to the required depth, the drill is raised and sent to the forge for re-sharpening. A cartridge $x$, is lightly secured to the end of a stiff wooden pole X', of suitable length (Fig. 26, Sheet 6) and in such a manner as to be easily disengaged by turning the rod. It is then lowered through half of the column G into and through the telescoping casting N, Fig. 26. The drill-engine is then lowered to the top of the rod so that the weight of the engine J, and plungers L—L, rests on the rod and forces the cartridge down through the slushy debris to the bottom of the hole, the debris forming good tamping. The rod X' is then turned to disengage it from the cartridge X, and removed. When all holes have been charged and the drill-columns all raised, the wires from the different holes are joined and connected with a battery and all the charges simultaneously fired.

If the holes have been heavily charged the machine is drawn back 20 or 30 feet before firing.

I do not herein claim the engine illustrated in part, nor the chuck or clutch for holding the drill, the same being claimed in another application Serial No. 164,300, filed at the same time and copending herewith entitled Engine for submarine drilling.

Claims:

1. A gang-drill for subaqueous work consisting of a floating vessel provided with anchoring and warping devices and a plurality of swinging cranes having vertical front members hinged together by horizontal girders, in combination with drill columns flexibly and slidably connected with said front members, each drill column being provided with legs automatically adjustable to the inequalities of the rock-bottom, and with a drill and drill actuating mechanism slidably connected with one of the aforesaid drill columns.

2. A gang-drill as described in claim 1, provided with hydraulic hoists constructed and arranged to raise and lower the drill and its actuating engine and feed the drill to its work.

3. A gang-drill as described in claim 1, provided with means for swinging the drill columns away from the lower ends of the vertical front members of the cranes.

4. A gang-drill as described in claim 1, provided with swinging rollers at the lower ends of the vertical front members of the cranes, and means for swinging said rollers against said drill-columns and thereby swinging said columns away from the lower ends of said vertical front members of said cranes.

5. A gang-drill as described in claim 1, provided with an intermediate vertical member mounted on the horizontal hinged girders that connect the vertical front members of the cranes, said intermediate vertical front member being provided with a duplicate of the entire equipment described in claims 1, 2 and 3, as connected with each of the vertical front members of the aforesaid cranes.

6. In combination a floating vessel for subaqueous rock excavation with anchoring and warping devices, a swinging crane mounted on said vessel, said crane having a vertical front member, a drill column flexibly and slidably connected with the vertical front member of the crane so as to be raised and lowered along said front member, legs at the lower end of said drill-column automatically adjustable to the inequalities of the rock-bottom, a drill and drill actuating mechanism slidably mounted so that it may be raised and lowered along said column.

7. In a rock-drilling machine as described in claim 6, a platform extending from said floating vessel out under the cranes.

8. In a rock-drilling machine as described in claims 6 and and 7, a car and car track, constructed and arranged automatically to carry the drill-steel to and from the forge by the weight of the drill-steel as it is raised and lowered.

9. In a rock-drilling machine as described in claim 6, means for swinging the drill-column away from the foot of the vertical front member of the crane.

10. In a rock-drilling machine as described in claim 6, a roller at the foot of the vertical member of the crane, constructed and arranged to be swung against the drill-column and thereby to swing said drill-column away from the foot of the vertical front member of said crane, and means for swinging said roller and drill-column away from the vertical member of the crane.

11. A drill-column having an offset, a tubular extension of said column below said offset forming a guide and guard for a drill-steel and having at its lower end a casting carrying legs that automatically adjust themselves to the inequalities of the rock bottom, an automatically telescoping extension at the lower end of said drill-column and brackets on opposite sides of said column above the automatically adjustable legs and a casting on the offset, said brackets and casting being constructed and arranged to hold duplicate hydraulic hoists in position, and in combination with said hoists.

12. In combination with, and mounted on a drill-column such as described in claim 11, a drill and drill-engine above the offset, hydraulic cylinders and plungers below the offset, mounted on brackets on opposite sides of the drill-column, near the lower end thereof, said cylinders and plungers being arranged to raise and lower said drill-engine and drill along the column above the offset, and to feed said drill to its work.

13. In combination: a drill column such as described in claims 11 and 12, having at its upper end, a flexible, slidable connection, with a vertical support and means for raising and lowering said drill-column along said vertical supports.

14. In a rock-drilling mechanism as described in claim five, a roller on the flexible connection between the drill-column and vertical front member of the crane, constructed and arranged to prevent said flexible connection from coming in contact with the edges of the slot in said vertical front member of the crane.

In witness whereof, I have hereunto subscribed my name this 21st day of March, A. D. 1917, in the presence of two attesting witnesses.

RALPH G. PACKARD.

Witnesses:
 JOHN F. CLARKE,
 CHAS. P. BLEECKER.